United States Patent
Fuchikami

(10) Patent No.: US 7,747,806 B2
(45) Date of Patent: Jun. 29, 2010

(54) RESOURCE USE MANAGEMENT DEVICE, RESOURCE USE MANAGEMENT SYSTEM, AND CONTROL METHOD FOR A RESOURCE USE MANAGEMENT DEVICE

(75) Inventor: Ryuji Fuchikami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 274 days.

(21) Appl. No.: 11/806,582

(22) Filed: Jun. 1, 2007

(65) Prior Publication Data

US 2007/0283065 A1 Dec. 6, 2007

(30) Foreign Application Priority Data

Jun. 2, 2006 (JP) .............................. 2006-154281

(51) Int. Cl.
*G06F 12/00* (2006.01)
(52) U.S. Cl. .................... 710/242; 710/116; 370/395.41
(58) Field of Classification Search ......... 710/240–244, 710/113–125, 40–41, 45; 370/395.41
See application file for complete search history.

(56) References Cited

U.S. PATENT DOCUMENTS

| 6,324,616 | B2 * | 11/2001 | Chrysos et al. ............. 710/244 |
| 6,868,466 | B2 * | 3/2005 | Connor ....................... 710/260 |
| 2005/0204085 | A1 | 9/2005 | Fukuyama et al. |

FOREIGN PATENT DOCUMENTS

JP 2005-258867 9/2005

OTHER PUBLICATIONS

Giorgio C. Buttazzo, "Hard Real-Time Computing Systems, Predictable Scheduling Algorithms and Applications", Kluwer Academic Publishers, Second Printing 2000, pp. 132-139.

* cited by examiner

*Primary Examiner*—Clifford H Knoll
(74) *Attorney, Agent, or Firm*—Wenderoth, Lind & Ponack, L.L.P.

(57) ABSTRACT

In a bus arbitration device that utilizes a resource use management device, upon detecting that a processor is permitted to access a memory, a detection unit decreases a counter by 1 and starts a timer, in a delay circuit, that is not in operation to count time. When the timer counts to a predetermined cycle time period, the delay circuit increases the counter by 1. A control unit permits the processor to access the memory, if the counter is larger than 0.

17 Claims, 9 Drawing Sheets

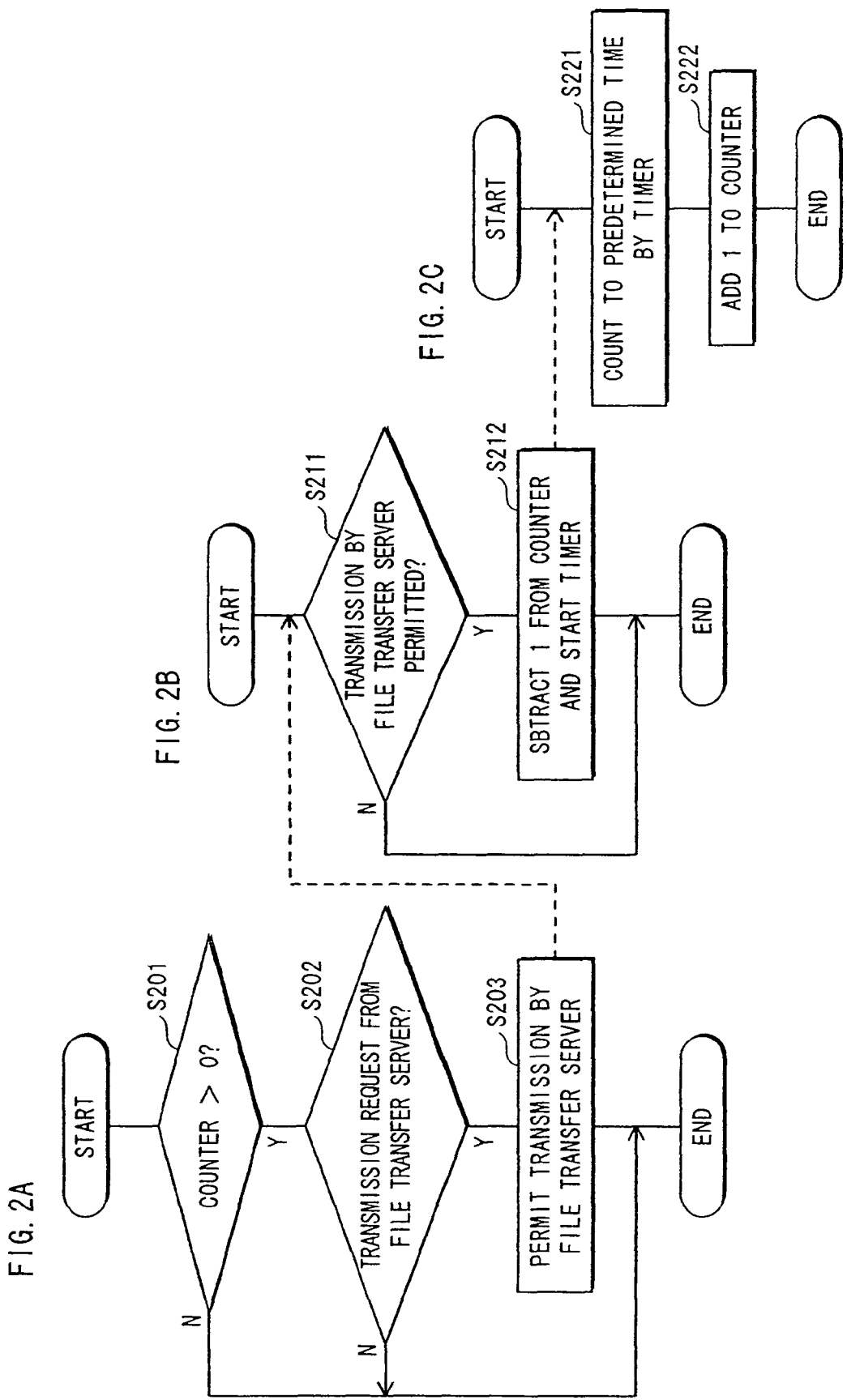

FIG. 3A

| 301 | TIMER | | | | | | | | | 4 | 3 | 2 | 1 | 0 | | | | | 4 | 3 | 2 | 1 | 0 |
|---|---|---|---|---|---|---|---|---|---|---|---|---|---|---|---|---|---|---|---|---|---|---|---|
| 302 | TIMER | | | | | 4 | 3 | 2 | 1 | 0 | | | | | 4 | 3 | 2 | 1 | 0 | | | | |
| 303 | TRANSMISSION CYCLE | 1 | 2 | 3 | 4 | 5 | 1 | 2 | 3 | 4 | 5 | 1 | 2 | 3 | 4 | 5 | 1 | 2 | 3 | 4 | 5 | | |
| 304 | PACKET TRANSMISSION | − | − | A | A | − | − | − | 1 | 1 | − | A | A | W | W | 1 | 1 | A | A | W | W | | |
| 305 | REMAINING TRANSMISSION COUNT | 2 | 2 | 2 | 1 | 0 | 0 | 0 | 1 | 2 | 2 | 1 | 0 | 0 | 0 | 1 | 2 | 1 | 0 | 0 | 0 | | |
| | | ↖$T_1$ | ↖$T_2$ | ↖$T_3$ | ↖$T_4$ | ↖$T_5$ | ↖$T_6$ | ↖$T_7$ | ↖$T_8$ | ↖$T_9$ | ↖$T_{10}$ | ↖$T_{11}$ | ↖$T_{12}$ | ↖$T_{13}$ | | | | | | | | | |

FIG. 3B

| 311 | SHIFT REGISTER | 0 | 0 | 0 | 1 | 0 | 0 | 0 | 0 | 1 | 1 | 1 | 0 | 0 | 0 | 0 | 0 | 0 | 0 | 0 | 0 |
| | | 0 | 0 | 0 | 0 | 1 | 0 | 0 | 0 | 0 | 1 | 1 | 1 | 0 | 0 | 0 | 0 | 0 | 0 | 0 | 0 |
| | | 0 | 0 | 0 | 0 | 0 | 1 | 0 | 0 | 0 | 0 | 1 | 1 | 1 | 0 | 0 | 0 | 0 | 0 | 0 | 0 |
| | | 0 | 0 | 0 | 0 | 0 | 0 | 1 | 0 | 0 | 0 | 0 | 1 | 1 | 1 | 0 | 0 | 0 | 0 | 0 | 0 |
| | | 0 | 0 | 0 | 0 | 0 | 0 | 0 | 1 | 0 | 0 | 0 | 0 | 1 | 1 | 1 | 0 | 0 | 0 | 0 | 0 |
| 303 | TRANSMISSION CYCLE | 1 | 2 | 3 | 4 | 5 | 1 | 2 | 3 | 4 | 5 | 1 | 2 | 3 | 4 | 5 | 1 | 2 | 3 | 4 | 5 |
| 304 | PACKET TRANSMISSION | − | − | A | A | − | − | − | 1 | 1 | − | A | A | W | W | 1 | 1 | A | A | W | W |
| 305 | REMAINING TRANSMISSION COUNT | 2 | 2 | 2 | 1 | 0 | 0 | 0 | 1 | 2 | 2 | 1 | 0 | 0 | 0 | 1 | 2 | 1 | 0 | 0 | 0 |
| | | ↖$T_1$ | ↖$T_2$ | ↖$T_3$ | ↖$T_4$ | ↖$T_5$ | ↖$T_6$ | ↖$T_7$ | ↖$T_8$ | ↖$T_9$ | ↖$T_{10}$ | ↖$T_{11}$ | ↖$T_{12}$ | ↖$T_{13}$ | | | | | | | |

FIG.7

| | T1 | T2 | T3 | T4 | T5 | T6 | T7 | T8 | T9 | T10 | T11 | T12 | T13 |
|---|---|---|---|---|---|---|---|---|---|---|---|---|---|
| 701 TIMER | | | | 4 | 3 | 2 | 1 | 0 | | 4 | 3 | 2 | 1 | 0 |
| 702 TIMER | 1 | 2 | 3 | 4 | | 0 | 1 | 2 | | | 2 | 1 | 0 |
| 703 TRANSFER CYCLE | 1 | 2 | 3 | 4 | 5 | 1 | 2 | 3 | 4 | 5 | 1 | 2 | 3 | 4 | 5 |
| 704 DMA | A | A | W | A | A | A | A | A | | W | W | W | W | A | A |
| 705 PROCESSOR | 1 | 1 | A | A | A | 1 | 1 | 1 | 1 | A | A | A | A | A | 1 |
| 706 REMAINING ACCESS COUNT | 2 | 2 | 2 | 1 | 0 | 0 | 0 | 1 | 2 | 2 | 1 | 0 | 0 | 0 | 1 | 0 |

FIG. 9

| | TIMER | TRANSFER CYCLE | FIRST MASTER | SECOND MASTER | ACCESS COUNTER |
|---|---|---|---|---|---|
| T1 | 1 | 1 | A | – | 2 |
| T2 | 0 | 2 | A | – | 2 |
| T3 | 4 | 3 | W | A | 2 |
| T4 | 3 | 4 | W | A | 1 |
| T5 | 2 | 5 | A | – | 0 |
| | 1 | 1 | A | – | 0 |
| | 0 | 2 | A | – | 0 |
| T6 | 4 | 3 | A | – | 2 |
| | 3 | 4 | – | – | 2 |
| | 2 | 5 | – | – | 2 |
| T7 | 1 | 1 | W | A | 2 |
| T8 | 0 | 2 | W | A | 1 |
| T9 | 4 | 3 | W | A | 2 |
| T10 | 3 | 4 | W | A | 1 |
| T11 | 2 | 5 | A | – | 0 |
| | 1 | 1 | A | – | 0 |
| | 0 | 2 | A | – | 0 |
| | 4 | 3 | A | – | 2 |
| | 3 | 4 | A | – | 2 |
| | 2 | 5 | A | – | 2 |

901 TIMER
902 TRANSFER CYCLE
903 FIRST MASTER
904 SECOND MASTER
905 ACCESS COUNTER

RESOURCE USE MANAGEMENT DEVICE, RESOURCE USE MANAGEMENT SYSTEM, AND CONTROL METHOD FOR A RESOURCE USE MANAGEMENT DEVICE

BACKGROUND OF THE INVENTION

1. Field of the Invention

The present invention relates to techniques of restricting a time for using a specific resource by a master device.

2. Related Art

When a resource is shared by a plurality of master devices that are implemented on one or more LSIs (Large Scale Integration), there may be a need to have one master device use the resource without delay as much as possible upon a resource use request, while ensuring that another master device can use the resource a predetermined number of times per predetermined time period.

One example of such cases is explained below. A DMA (Direct Memory Access) controller and a processor as master devices share a memory as a resource. The DMA controller reads video data from the memory, and the read video data is sequentially played back by a playback device. The processor reads control data and the like from the memory, and controls a system using the read control data and the like.

To sequentially play back the video data while reading it, the DMA controller needs to be ensured of a predetermined number of memory accesses per predetermined time period. Meanwhile, to realize display screen switching controls and the like of high user responsiveness, the processor, which exercises such controls, needs to be allowed to access the memory without delay as much as possible.

In this case, a certain limit may need to be put on a time for which the processor occupies the memory resource, i.e. the number of memory accesses by the processor, in order to ensure the predetermined number of memory accesses for the DMA controller.

As one example of such resource use time restriction techniques, Japanese patent application publication No. 2005-258867 discloses a technique of restricting, when a plurality of devices (hereafter called "bus masters") are connected to a memory bus, the number of memory accesses by a bus master, to thereby arbitrate between access requests from the plurality of bus masters.

The following explains an arbitration device disclosed in Japanese patent application publication No. 2005-258867.

To arbitrate for memory access between a bus master (hereafter called a "first master") that needs to be ensured of a fixed number of accesses per predetermined transfer cycle (e.g. 63.6 μs) and a bus master (hereafter called a "second master") whose access delay needs to be minimized while ensuring the fixed number of accesses for the first master, the arbitration device defines a maximum number of accesses the second master is permitted per predetermined transfer cycle, and priorities of the bus masters.

Suppose, in the case where five memory accesses are possible per predetermined transfer cycle, it is necessary to ensure the first master of three accesses per transfer cycle. This being the case, the arbitration device sets the maximum number of accesses the second master is permitted to perform per transfer cycle to two, and assigns a higher priority to the second master than the first master in order to minimize an access delay of the second master.

When an access request by the first master and an access request by the second master conflict with each other, the arbitration device prioritizes the second master in access permission, under a condition that the number of accesses by the second master within the current transfer cycle is smaller than the maximum number of permitted accesses (two). If the number of accesses by the second master within the current transfer cycle is the maximum number of permitted accesses (two), the arbitration device prohibits the second master from access.

In more detail, a remaining number of accesses the second master is permitted in each transfer cycle is set in an access counter internal to the arbitration device. Each time the second master is permitted to perform access, the access counter is decreased by 1. At the beginning of each transfer cycle, the access counter is reset to the maximum number of accesses the second master is permitted (two).

When an access request by the first master and an access request by the second master conflict with each other, the arbitration device permits the second master to perform access if the access counter is larger than 0, and prohibits the second master to perform access and permits the first master to perform access if the access counter is 0.

In this way, the arbitration device can reduce an access delay of the second master by prioritizing the second master, and also ensure the fixed number of accesses per transfer cycle for the first master by restricting the number of accesses the second master is permitted per transfer cycle.

However, this conventional technique can encounter the following problem. The beginning of an initial transfer cycle in the first master is determined based on a time at which the first master accesses the memory for the first time. However, there may be a case where this beginning of the transfer cycle is unknown to the arbitration device due to a reason such as the arbitration device having not been informed of the beginning by the first master.

In such a case, the timing of resetting the access counter in the arbitration device may not coincide with the beginning of each transfer cycle in the first master. When this occurs, the arbitration device will end up failing to appropriately restrict the number of accesses by the second master.

One example of this is explained below, with reference to FIG. 9.

FIG. 9 shows an example result of arbitrating between memory access requests from the first master and the second master by the arbitration device disclosed in Japanese patent application publication No. 2005-258867.

In this example, five memory accesses are possible per transfer cycle, the number of accesses ensured for the first master per transfer cycle is three, and the maximum number of accesses the second master is permitted per transfer cycle is two.

In FIG. 9, a timer 901 shows a value of a timer internal to the arbitration device. The timer is initially set to 4, and decreased by 1 each time a clock is received. When the timer reaches 0, it is reset to the initial value "4". A transfer cycle 902 shows a transfer cycle in the first master and the second master, where one transfer cycle is made up of time slices 1 to 5.

In this example, the beginning of each transfer cycle is unknown to the arbitration device, and accordingly the timing of resetting the timer 901 (when the timer 901 is 4) does not coincide with the beginning of the transfer cycle 902 (when the transfer cycle 902 is 1), as shown in FIG. 9.

A first master 903 shows whether or not an access request is made by the first master and whether or not the access request is permitted. In FIG. 9, a mark "I" denotes a state where the first master does not request access, a mark "A" denotes a state where the first master requests access and the access is permitted, and a mark "W" denotes a state where the first master requests access and the access is not permitted.

A second master 904 shows whether or not an access request is made by the second master and whether or not the access request is permitted. The meanings of the marks "I", "A", and "W" are the same as those in the first master 903. An access counter 905 shows a remaining number of accesses the second master is permitted per transfer cycle.

A case where three memory accesses can be ensured for the first master is explained first.

T1 and T2 indicate times at which only the first master requests access. At T1 and T2, the arbitration device permits the first master to access the memory.

T3 indicates a time at which the first master and the second master request access. At T3, the access counter 905 is "2" which is larger than "0", and so the arbitration device permits the second master to access the memory, and the access counter 905 is decreased by 1 to "1".

T4 indicates a time at which the first master and the second master request access, as with T3. At T4, the access counter 905 is "1" which is larger than "0", and so the arbitration device permits the second master to access the memory, and the access counter 905 is decreased by 1 to "0".

T5 indicates a time at which only the first master requests access. At T5, the arbitration device permits the first master to access the memory.

Thus, in the transfer cycle of T1 to T5, the access delay by the second master can be reduced while ensuring three accesses for the first master per transfer cycle.

A case where three memory accesses cannot be ensured for the first master is explained next.

T7 and T8 indicate times at which the first master and the second master request access. At T6, the timer 901 is reset to the initial value "4", and the access counter 905 is reset to the initial value "2". At T7 and T8, the access counter 905 is larger than "0", and so the arbitration device permits the second master to access the memory, and the access counter 905 is decreased by 1 to "0".

T9 indicates a time at which the timer 901 is reset to the initial value "4" and the access counter 905 is reset to the initial value "2". At T9 and T10, the first master and the second master request access, as with T7 and T8. At T9 and T10, the access counter 905 is larger than "0", and so the arbitration device permits the second master to access the memory.

T11 indicates a time at which only the first master requests access. At T11, the arbitration device permits the first master to access the memory.

Thus, in the transfer cycle of T7 to T11, though the access delay by the second master is reduced, three accesses per transfer cycle cannot be ensured for the first master.

SUMMARY OF THE INVENTION

The present invention was conceived in view of the above problem, and aims to provide a resource use management device that, even if the beginning of a resource use cycle is unknown when a plurality of devices share a specific resource, can ensure a fixed resource use time for one device per cycle, by imposing a certain limit on resource use by another device in consideration of resource use readiness of the other device.

The stated aim can be achieved by a resource use management device that manages use of a resource by an external device, the resource use management device including: a counter; a detection unit operable to detect that the external device is allowed to use the resource, and advance a value of the counter each time the detection is performed; a delay unit operable to move back the value of the counter when a predetermined time period has elapsed since each time the detection is performed; and a control unit operable to judge whether to allow the external device to use the resource, based on the value of the counter.

The stated aim can also be achieved by a resource use management system including an external device, a resource, and a resource use management device that manages use of the resource by the external device, the resource use management device including: a counter; a detection unit operable to detect that the external device is allowed to use the resource, and advance a value of the counter each time the detection is performed; a delay unit operable to move back the value of the counter when a predetermined time period has elapsed since each time the detection is performed; and a control unit operable to judge whether to allow the external device to use the resource, based on the value of the counter.

The stated aim can also be achieved by a control method used in a resource use management device that manages use of a resource by an external device, the control method including steps of: detecting that the external device is allowed to use the resource, and advancing a value of the counter each time the detection is performed; moving back the value of the counter when a predetermined time period has elapsed since each time the detection is performed; and judging whether to allow the external device to use the resource, based on the value of the counter.

Here, "to advance the value of the counter" means to increase or decrease the value of the counter, and "to move back the value of the counter" means to cause the value of the counter to regress in an opposite direction to advancing the value of the counter. Which is to say, if to advance the value of the counter is to increase the value of the counter, to move back the value of the counter is to decrease the value of the counter. If to advance the value of the counter is to decrease the value of the counter, on the other hand, to move back the value of the counter is to increase the value of the counter.

It should be noted that in order to use the resource, the external device needs to send predetermined information for using the resource (e.g. address information when reading data from a memory that is the resource) to the resource.

The term "allow" in "the external device is allowed to use the resource" has the following meanings. In the case where the external device sends a resource use request to use the resource before sending the predetermined information, "allow" means that the control unit in the resource use management device outputs a permission response to the resource use request. In the case where the external device sends the predetermined information without sending the resource use request, "allow" means that the control unit in the resource use management device transfers the predetermined information sent from the external device, to the resource.

Also, "the detection" by the detection unit means to detect the permission response output by the control unit or to detect the predetermined information transferred by the control unit.

According to the above construction, for example, the initial value of the counter is the maximum number of times the external device is allowed to use the resource per predetermined time period, the value of the counter is decreased by 1 each time the detection unit performs the detection, and the control unit judges to allow the external device to use the resource when the value of the counter is larger than 0. This being the case, the external device can use the resource until the counter reaches 0, that is, within the range of the maximum number of uses of the resource allowed per predetermined time period. Hence the readiness for resource use by the external device can be achieved within the limitation of the maximum number of uses per predetermined time period.

Also, the value of the counter is decreased by 1 when the detection unit detects that the external device is allowed to use the resource. This decreased counter value will not be increased until the predetermined time period has elapsed.

In other words, each time the detection is performed, the number of uses of the resource by the external device is restricted for the predetermined time period. Therefore, in any cycle of the predetermined time period that begins at any unit of time, the number of uses of the resource by the external device is restricted to no more than the maximum number of uses. Accordingly, in the case where another external device shares the resource with the external device, a fixed number of uses of the resource per predetermined time period can be ensured for the other external device.

Here, the control unit may judge not to allow the external device to use the resource, if the value of the counter is a predetermined value.

According to the above construction, for example, the initial value of the counter is the maximum number of times the external device is allowed to use the resource per predetermined time period, the value of the counter is decreased by 1 each time the detection unit performs the detection, and the predetermined value is 0. This being the case, when the value of the counter is the predetermined value (0), the control unit judges not to allow the external device to use the resource. This enables the readiness for resource use by the external device to be achieved within the limitation of the maximum number of uses allowed per predetermined time period.

Also, since the decreased counter value will not be increased until the predetermined time period has elapsed. Accordingly, in any cycle of the predetermined time period that begins at any unit of time, the number of uses of the resource by the external device can be restricted to no more than the maximum number of uses.

Therefore, in the case where another external device shares the resource with the external device, a fixed number of uses of the resource per predetermined time period can be ensured for the other external device.

Here, the detection unit may advance the value of the counter by 1 each time the detection is performed, wherein the delay unit moves back the value of the counter by 1 when the predetermined time period has elapsed since each time the detection is performed, and the control unit judges whether to allow the external device to use the resource, based on whether a difference between the value of the counter and an initial value of the counter is smaller than a value corresponding to a number of units of time in which the external device is able to use the resource per cycle of the predetermined time period.

According to the above construction, the control unit performs the judgment based on whether or not the difference between the value of the counter and the initial value of the counter is smaller than the number of units of time in which the external device can use the resource (i.e. the number of times the external device can use the resource) per predetermined time period. Therefore, the judgment as to whether or not to allow the external device to use the resource can be performed irrespective of the initial value of the counter and irrespective of whether "to advance the value of the counter" by 1 is to increase or decrease the value of the counter.

Here, an initial value of the counter may be no smaller than 2, wherein the detection unit decreases the value of the counter by 1 each time the detection is performed, the delay unit increases the value of the counter by 1 when the predetermined time period has elapsed since each time the detection is performed, and the control unit judges whether to allow the external device to use the resource, based on whether the value of the counter is larger than 0.

Here, the external device may be a processor, wherein the resource is a memory.

Here, the external device may be a communication terminal, wherein the resource is a transmission line.

Here, the delay unit may include a same number of timers as a number of units of time in which the external device is able to use the resource per cycle of the predetermined time period, wherein the delay unit starts one of the timers which is not in operation to count to the predetermined time period each time the detection is performed, and moves back the value of the counter after the timer counts to the predetermined time period.

According to the above construction, the delay unit includes the same number of timers as the number of units of time in which the external device can use the resource per predetermined time period. Therefore, each time the detection unit detects that the external device is allowed to use the resource, the delay unit can count to the predetermined time period by using a timer that is not in operation.

Here, the delay unit may include a shift register having storage elements corresponding to a same number of stages as a number obtained by dividing the predetermined time period by one unit of time, wherein the delay unit inputs data into the shift register each time the detection is performed, shifts a storage location of the data to a next stage per unit of time, and moves back the value of the counter when the data is output from the shift register.

According to the above construction, the shift register has the storage elements corresponding to the same number of stages as the number obtained by dividing the predetermined time period by one unit of time. When the detection unit detects that the external device is allowed to use the resource, data is input into the shift register. This data input in the shift register is shifted to a storage location of a next stage per unit of time, and output from the shift register the predetermined time period after the detection. In this way, the predetermined time period can be counted from the detection.

Here, the resource use management device may be capable of switching between a first mode that is a normal operation mode and a second mode that is a lower power consumption mode than the first mode, wherein the first mode is switched to the second mode when no data is held in the shift register.

According to the above construction, when no data is held in the shift register, the operation mode of the resource use management device is switched to the second mode that consumes less power, with it being possible to save power.

Here, the resource use management device may further manage use of the resource by a specific external device which time-shares the resource with the external device, wherein when judging not to allow the external device to use the resource, the control unit judges to allow the specific external device to use the resource.

According to the above construction, for example, the initial value of the counter is the maximum number of times the external device is allowed to use the resource per predetermined time period, the value of the counter is decreased by 1 each time the detection unit performs the detection, and the control unit judges not to allow the external device to use the resource when the value of the counter is 0. This being the case, the external device can use the resource when the value of the counter is larger than 0, that is, within the range of the maximum number of uses allowed per predetermined time period. Hence the readiness for resource use by the external device can be achieved.

Also, when the value of the counter is 0, the control unit judges not to allow the external device to use the resource, and judges to allow the specific external device to use the resource. This enables resource use arbitration to be conducted while ensuring a fixed number of resource uses per predetermined time period for the specific external device.

Here, the resource use management device may further manage use of the resource by a specific external device that time-shares the resource with the external device, wherein the control unit judges to allow the external device to use the resource irrespective of the value of the counter, if the specific external device does not need to use the resource.

According to the above construction, when the specific external device does not need to use the resource, the control unit judges to allow the external device to use the resource irrespective of the value of the counter. This enhances the resource use efficiency.

Here, the detection unit may refrain from performing the detection when the value of the counter is a predetermined value.

According to the above construction, for example, the detection unit decreases the value of the counter by 1 each time the detection is performed, and the predetermined value is 0 which is a smallest value of the counter. This being the case, when the specific external device does not need to use the resource and the control unit judges to allow the external device to use the resource, the detection unit does not perform the detection if the value of the counter is the predetermined value (0). This keeps the value of the counter from becoming smaller than the smallest value (0).

Here, the delay unit may refrain from moving back the value of the counter when the value of the counter is an initial value of the counter.

According to the above construction, if the value of the counter is the initial value of the counter, the delay unit does not move back the value of the counter. For instance, when the initial value of the counter is the maximum number of times the external device is allowed to use the resource per predetermined time period, a change in the maximum number can be prevented.

Here, the resource use management device may further include: a selection unit operable to select one of a plurality of devices as the external device.

According to the above construction, the selection unit selects one of the plurality of devices as the external device, with it being possible to arbitrate for resource use between the specific external device and the plurality of devices.

Here, the external device may be a processor, wherein the resource is a memory.

Here, the external device may be a communication terminal, wherein the resource is a transmission line.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIGS. 2A, 2B, and 2C are flowcharts respectively showing operations of a control unit, a detection unit, and a delay circuit in the resource use management device shown in FIG. 1;

FIGS. 3A and 3B are timing charts respectively showing operations of the resource use management device shown in FIG. 1 and a resource use management device according to a modification to the first embodiment;

FIG. 7 is a timing chart showing an operation of the bus arbitration device shown in FIG. 5;

FIG. 9 is a timing chart showing an operation of a conventional arbitration device.

DESCRIPTION OF THE PREFERRED EMBODIMENT(S)

Figure 1:
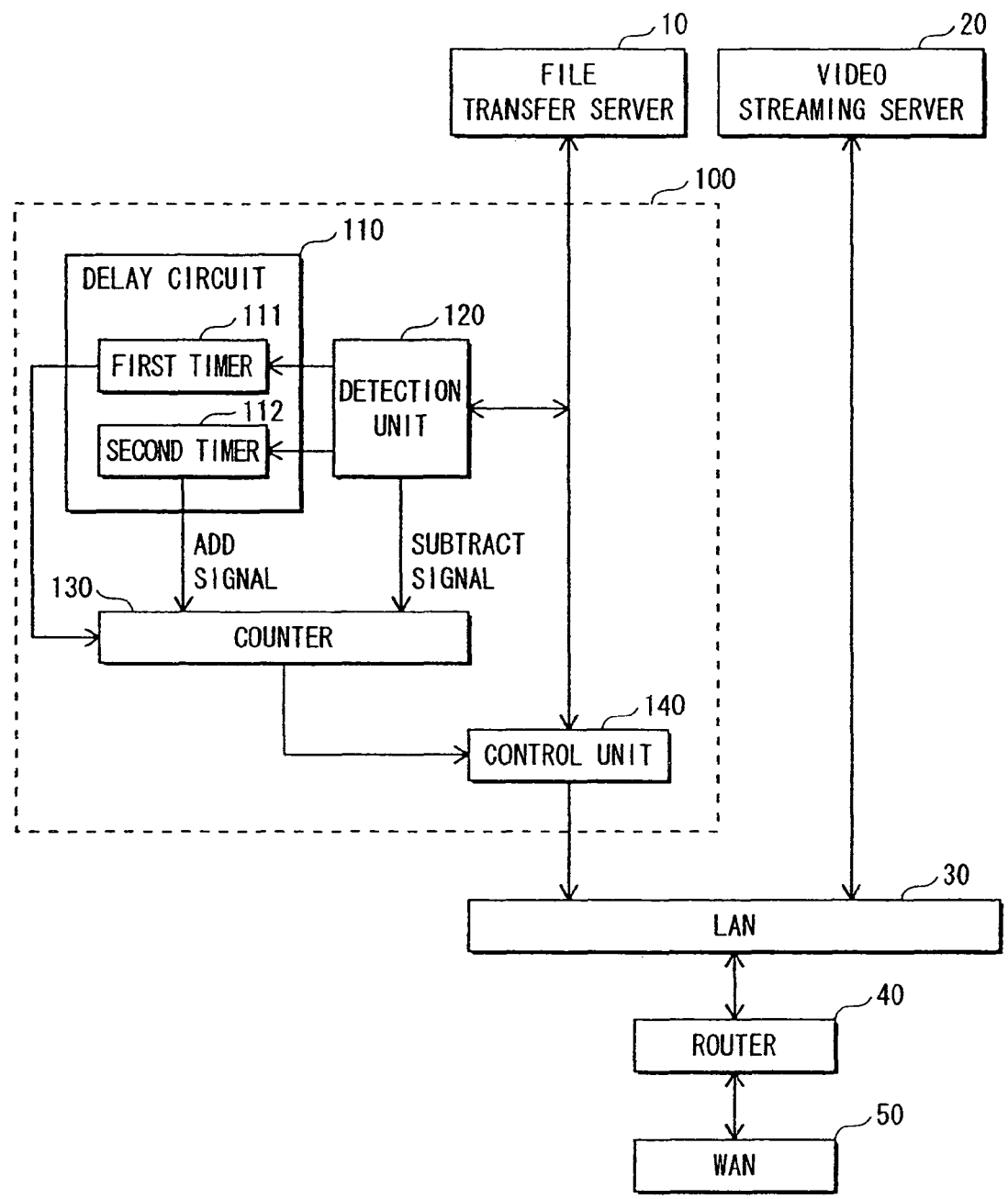
FIG. 1 shows an example construction of a communication system that includes a resource use management device according to a first embodiment of the present invention.

Embodiments of the present invention are described below with references to drawings.

First Embodiment

The following describes a resource use management device according to a first embodiment of the present invention.

<Overview>

A resource use management device 100 according to the first embodiment operates as follows. Suppose a file transfer server and a video streaming server transmit packets to a WAN (Wide Area Network) via a router. In one cycle of a predetermined time period (hereafter called a "transmission cycle"), the resource use management device 100 permits the file transfer server to perform packet transmission within a limitation of a predetermined number of times, and prohibits the file transfer server from performing packet transmission once the predetermined number is reached, to thereby ensure a fixed number of packet transmissions for the video streaming server.

To do so, the resource use management device 100 sets a maximum number of packets the file transfer server is permitted to transmit per transmission cycle, as an initial value of a counter internal to the resource use management device 100. This initial value is obtained by subtracting the number of packets ensured for the video streaming server to transmit per transmission cycle, from the number of packets the resource use management device 100 allows to be transmitted per transmission cycle.

At the beginning of each unit of time (a time obtained by dividing the transmission cycle time period by the number of packets the resource use management device 100 allows to be transmitted per transmission cycle), the resource use management device 100 judges whether or not the counter is larger than 0. When the counter is larger than 0, if a packet transmission request is received from the file transfer server, the resource use management device 100 permits the file transfer server to perform packet transmission in the unit of time, and decreases the counter by 1.

When the counter is 0, on the other hand, the resource use management device 100 prohibits the file transfer server from performing packet transmission in the unit of time.

The resource use management device 100 includes the same number of timers as the maximum number of packets (i.e. the initial value of the counter) the file transfer server is permitted to transmit per transmission cycle. Each time the file transfer server is permitted to perform packet transmission, the resource use management device 100 starts one of the timers, that is not in operation, to count time. Each time the timer counts to the transmission cycle time period, the resource use management device 100 increases the counter by 1.

In other words, after the resource use management device 100 permits the file transfer server to perform packet transmission, the counter will not be increased until the transmission cycle time period has elapsed. Suppose the initial value of the counter is 1 (that is, the maximum number of packets the file transfer server is permitted to transmit per transmission cycle is 1). This being the case, the number of packets transmitted by the file transfer server is restricted for the transmission cycle time period from when the file transfer server is permitted to perform packet transmission.

In the case where the initial value of the counter is 2 or more, too, each time the file transfer server is permitted to perform packet transmission, a remaining number of packets the file transfer server is permitted to transmit is decreased by 1 in the transmission cycle time period. Once the counter reaches 0, the file transfer server is no longer permitted to perform packet transmission.

Thus, each time the file transfer server is permitted to perform packet transmission, the number of packets transmitted by the file transfer server is restricted for the transmission cycle time period. Accordingly, in each transmission cycle that is assumed to begin at the beginning of any unit of time, the number of packets transmitted by the file transfer server is limited to no more than the maximum number of packets the file transfer server is permitted to transmit. As a result, the fixed number of packets can be ensured for the video streaming server to transmit per transmission cycle.

<Construction>

<Communication System>

FIG. 1 shows an example communication system that includes the resource use management device 100 according to the first embodiment.

First, a construction of the communication system is briefly explained below.

The communication system includes a file transfer server 10, a video streaming server 20, a LAN (Local Area Network) 30, a router 40, a WAN 50, and the resource use management device 100, as shown in FIG. 1.

The file transfer server 10 transfers a file in response to a request from a client (not illustrated) that connects to the WAN 50. Upon receiving a file transfer request from the client, the file transfer server 10 sends a packet transmission request to the resource use management device 100 connected via a LAN cable or the like, in order to transmit a requested file in units of packets. When permitted to perform packet transmission by the resource use management device 100, the file transfer server 10 transmits a packet.

The video streaming server 20 is connected to the router 40 via the LAN 30, and delivers video data to a client (not illustrated) that is connected to the WAN 50, by streaming.

For normal streaming delivery, the video streaming server 20 needs to transmit a predetermined size of video data per transmission cycle (e.g. 33 ms which is one frame time period) to the client, in accordance with a frame rate prescribed by a standard and the like.

In detail, to transmit the predetermined size of video data in units of packets, the video streaming server 20 needs to transmit the number of packets, that is obtained by dividing the data size of the video data to be transmitted by a packet payload size (e.g. 1472 bytes), per transmission cycle.

Hereafter, the packet payload size is assumed to be fixed for ease of explanation.

The router 40 is a typical router for transferring packets received via the LAN 30, to the WAN 50. The router 40 sequentially stores received packets in an internal buffer (queue), and transfers the packets to the WAN 50 in an order in which the packets are stored in the buffer.

The resource use management device 100 is connected to the file transfer server 10 and the LAN 30, and limits the number of packets transmitted by the file transfer server 10 per transmission cycle, to no more than a predetermined number.

<Resource Use Management Device 100>

The following describes a construction of the resource use management device 100 with reference to FIG. 1.

As shown in FIG. 1, the resource use management device 100 includes a delay circuit 110, a detection unit 120, a counter 130, and a control unit 140.

The resource use management device 100 also includes a clock generator (not illustrated). In the following description, a clock whose cycle is a unit of time obtained by multiplying or dividing a clock generated by the clock generator is assumed to be a reference clock in the resource use management device 100.

The delay circuit 110 is a typical delay circuit realized by a timer. The number of timers in the delay circuit 110 is equal to the maximum number of packets the file transfer server 10 is permitted to transmit per transmission cycle, i.e. an initial value of the counter 130 (described later). The timers are realized by typical timer circuits.

The following describes an example where the initial value of the counter 130 is 2, so that the delay circuit 110 is realized by two timers that are a first timer 111 and a second timer 112.

Each of the first timer 111 and the second timer 112 starts counting time, upon receipt of a start signal to start counting time from the detection unit 120 (described later). Having counted to the transmission cycle time period, the timer stops counting time, and outputs an add signal to add 1 to the counter 130.

Here, each timer counts to the transmission cycle time period by counting to the same number of reference clocks as a number obtained by dividing the transmission cycle time period by one unit of time.

The detection unit 120 is a circuit which detects that the file transfer server 10 is permitted to perform packet transmission, per unit of time. Each time the permission is detected, the detection unit 120 outputs a subtract signal to subtract 1 to the counter 130, and outputs a start signal to start counting time to one of the first timer 111 and the second timer 112 that is not in operation.

As one example, the detection unit 120 detects that the file transfer server 10 is permitted to perform packet transmission in the following manner. When the file transfer server 10 is permitted to perform packet transmission, the control unit 140 (described later) outputs an ACK signal to the file transfer server 10. The detection unit 120 detects the output of this ACK signal based on the reference clock, per unit of time.

Note here that the timing with which the detection unit 120 performs the detection has a slight delay from the timing with which the control unit 140 (described later) outputs the ACK signal (i.e. the beginning of a unit of time).

Since the delay circuit 110 has the two timers that are the first timer 111 and the second timer 112, each time an ACK signal is detected, the detection unit 120 outputs a start signal alternately to the first timer 111 and the second timer 112.

As mentioned earlier, the number of timers in the delay circuit 110 is equal to the initial value of the counter 130. On the other hand, an ACK signal is output only when the counter 130 is larger than 0, as described later. Accordingly, at least one of the first timer 111 and the second timer 112 is not in operation (i.e. is not counting time) when the detection unit 120 detects an ACK signal.

When an ACK signal is detected for the first time after the start of the operation, the detection unit 120 may output a start signal to any of the first timer 111 and the second timer 112 that are not in operation. In the following description, however, it is assumed that the detection unit 120 outputs a start signal to the first timer 111, as one example.

The counter 130 is a counter circuit whose initial value is the maximum number of packets the file transfer server 10 is permitted to transmit per transmission cycle, and that can be increased/decreased depending on a received signal.

In this embodiment, the initial value is 2 as mentioned above. The counter 130 is decreased by 1 upon receipt of a subtract signal from the detection unit 120, and increased by 1 upon receipt of an add signal from the delay circuit 110.

The control unit 140 is a circuit that judges, per unit of time, whether or not to permit the file transfer server 10 to perform packet transmission, based on the value of the counter 130. Depending on the judgment result and whether or not a packet transmission request is received from the file transfer server 10, the control unit 140 controls whether or not to output an ACK signal to permit packet transmission to the file transfer server 10.

In more detail, the control unit 140 includes a comparison circuit, and compares, at the beginning of each unit of time, whether the counter 130 is larger than 0. When the counter 130 is larger than 0, the control unit 140 outputs an ACK signal to the file transfer server 10 if a packet transmission request is received from the file transfer server 10.

Here, the beginning of each unit of time is detected by detecting a leading edge of the reference clock.

<Operation>

FIGS. 2A, 2B, and 2C are flowcharts showing operations of the control unit 140, the detection unit 120, and the delay circuit 110 in the resource use management device 100, respectively. The following describes operations of the construction elements in the resource use management device 100 described above, with reference to FIGS. 2A, 2B, and 2C.

<Operation of the Control Unit 140>

In FIG. 2A, the control unit 140 in the resource use management device 100 judges, per unit of time, whether or not the counter 130 is larger than 0 (step S201). If the counter 130 is larger than 0 (step S201: Y), the control unit 140 judges whether or not a packet transmission request is received from the file transfer server 10 (step S202).

If a packet transmission request is received from the file transfer server 10 in step S202 (step S202: Y), the control unit 140 outputs an ACK signal to permit packet transmission in the unit of time to the file transfer server 10 (step S203), and ends the operation.

If the counter 130 is 0 in step S201 (step S201: N) or if no packet transmission request is received from the file transfer server 10 in step S202 (step S202: N), the control unit 140 ends the operation.

<Operation of the Detection Unit 120>

In FIG. 2B, the detection unit 120 in the resource use management device 100 detects an ACK signal output from the control unit 140 to the file transfer server 10 in step S203 in FIG. 2A, per unit of time (step S211). Upon detecting the ACK signal (step S211: Y), the detection unit 120 outputs a subtract signal to the counter 130, to decrease the counter 130 by 1.

Also, the detection unit 120 outputs a start signal to start counting time to one of the first timer 111 and the second timer 112 in the delay circuit 110 that is not in operation (step S212), and ends the operation.

If no ACK signal is detected in step S211 (step S211: N), the detection unit 120 ends the operation.

<Operation of the Delay Circuit 110>

In FIG. 2C, one of the first timer 111 and the second timer 112 that receives the start signal which is output from the detection unit 120 in step S212 in FIG. 2B starts counting time. When the timer counts to the transmission cycle time period (e.g. 33 ms) (step S221), the delay circuit 110 outputs an add signal to the counter 130 to increase the counter 130 by 1 (step S222), and ends the operation.

<Specific Example>

An operation of the resource use management device 100 is explained below using a specific example, with reference to a timing chart shown in FIG. 3A.

FIG. 3A shows an example packet transmission state of the file transfer server 10, where the number of packets the file transfer server 10 is permitted to transmit per transmission cycle is limited by the resource use management device 100.

In this example, the number of packets the resource use management device 100 allows to be transmitted per transmission cycle (e.g. 33 ms) is "5", the number of packets ensured for the video streaming server 20 to transmit per transmission cycle is "3", and the maximum number of packets the file transfer server 10 is permitted to transmit per transmission cycle is "2".

In FIG. 3A, a timer 301 shows a value of the first timer 111, whereas a timer 302 shows a value of the second timer 112. Upon receiving a start signal from the detection unit 120, each timer starts counting time by decreasing the initial value "4" by 1 per unit of time, and stops at 0.

A transmission cycle 303 shows a packet transmission cycle in the video streaming server 20. One transmission cycle is made up of time slices 1 to 5.

A packet transmission 304 shows whether or not a packet transmission request is made by the file transfer server 10 and whether or not the packet transmission request is permitted. A mark "I" denotes a state where the file transfer server 10 does not make a packet transmission request. A mark "A" denotes a state where the control unit 140 receives a packet transmission request from the file transfer server 10 and permits the packet transmission request. A mark "W" denotes a state where the control unit 140 receives a packet transmission request from the file transfer server 10 and does not permit the packet transmission request.

A remaining transmission count 305 shows a value of the counter 130.

An operation corresponding to each timing is explained below.

T1 and T2 indicate times at which the file transfer server 10 does not make a packet transmission request. At T1 and T2, the resource use management device 100 performs no specific operation.

T3 indicates a time at which the file transfer server 10 makes a packet transmission request. At T3, the remaining transmission count 305 is "2" which is larger than "0", and so the resource use management device 100 permits the file transfer server 10 to perform packet transmission, the remaining transmission count 305 is decreased by 1 to "1", and the first timer 111 which is not in operation starts counting time, as a result of which the timer 301 is "4".

T4 indicates a time at which the file transfer server 10 makes a packet transmission request. At T4, the remaining transmission count 305 is "1" which is larger than "0", and so the resource use management device 100 permits the file transfer server 10 to perform packet transmission, the remaining transmission count 305 is decreased by 1 to "0", and the second timer 112 which is not in operation starts counting time, as a result of which the timer 302 is "4". Meanwhile, the timer 301 is decreased by 1 to "3".

T5 indicates a time at which the file transfer server 10 does not make a packet transmission request. At T5, the resource use management device 100 performs no specific operation.

Thus, in the transmission cycle of T1 to T5, the packet transmission requests by the file transfer server 10 are promptly permitted. Also, since the number of packets transmitted by the file transfer server 10 is "2", so that three packet transmissions can be ensured for the video streaming server 20 in this transmission cycle.

T6 indicates a time at which the timer 301 reaches "0" and stops counting time. At T7 that follows, the remaining transmission count 305 is increased by 1 to "1". T7 indicates a time at which the timer 302 reaches "0" and stops counting time. At T8, the remaining transmission count 305 is increased by 1 to "2".

T9 and T10 indicate times at which the file transfer server 10 makes a packet transmission request. At T9 and T10, the remaining transmission count 305 is larger than "0", and so the resource use management device 100 permits the file transfer server 10 to perform packet transmission, and the remaining transmission count 305 is decreased to "0".

T11 to T13 indicate times at which the file transfer server 10 makes a packet transmission request. At T11 to T13, the remaining transmission count 305 is "0", and so the resource use management device 100 prohibits the file transfer server 10 from performing packet transmission.

Thus, in the transmission cycle of T9 to T13, the packet transmission requests by the file transfer server 10 are promptly permitted within the range of the maximum number of packets "2". Also, since the number of packets transmitted by the file transfer server 10 is limited to "2", three packet transmissions can be ensured for the video streaming server 20 in this transmission cycle.

According to the arbitration device disclosed in Japanese patent application publication No. 2005-258867, there is a case where the timing of resetting the access counter does not coincide with the beginning of each transfer cycle in the first master. As a result, the arbitration device may end up permitting more than the maximum number of accesses the second master is permitted to perform per transfer cycle, as shown in T7 to T11 in FIG. 9.

On the other hand, the resource use management device 100 according to the present invention restricts the number of packets transmitted by the file transfer server 10 for the transmission cycle time period, each time the file transfer server 10 is permitted to perform packet transmission. Therefore, in any transmission cycle that is assumed to begin at the beginning of any unit of time, the number of packets transmitted by the file transfer server 10 can be appropriately limited to no more than the maximum number of packets the file transfer server 10 is permitted.

As a result, the resource use management device 100 according to the present invention can ensure the fixed number of packets for the video streaming server 20 to transmit per transmission cycle.

Unlike the arbitration device disclosed in Japanese patent application publication No. 2005-258867, each timer (the first timer 111 and the second timer 112) in the resource use management device 100 starts counting time each time packet transmission is permitted, and stops upon counting to the transmission cycle time period. This being so, when none of the timers is counting time, it is possible to switch to a low power mode that consumes less power than when any of the timers is counting time, by stopping a clock supply, a power supply, and the like to the timers.

<Modification>

In the above embodiment, the delay circuit 110 in the resource use management device 100 counts to the transmission cycle time period by using the timers (the first timer 111 and the second timer 112). The following describes a modification to this embodiment, where the timers in the delay circuit 110 are replaced with a shift register.

Figure 4:
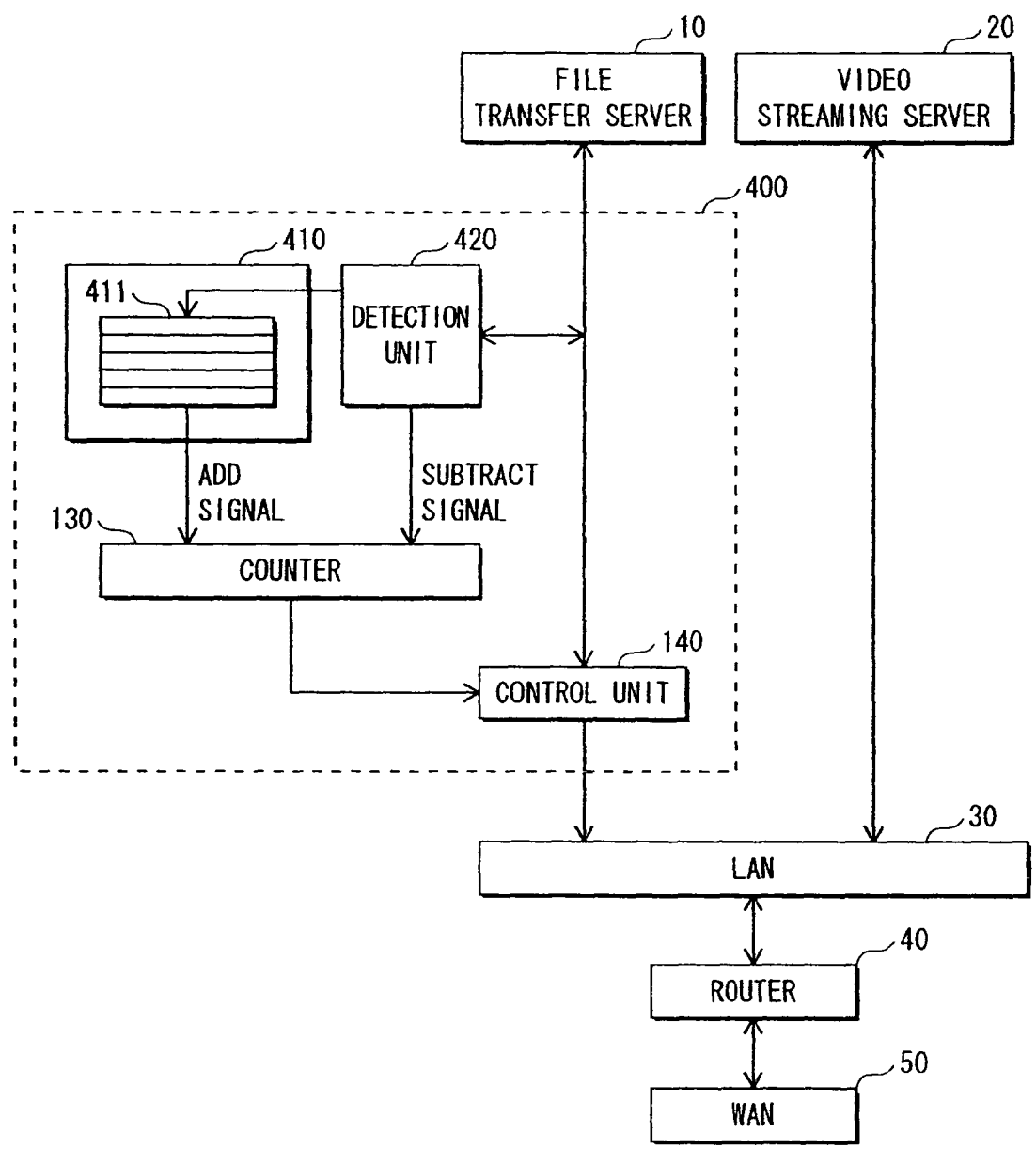
FIG. 4 shows a functional construction of the resource use management device according to the modification to the first embodiment.

FIG. 4 shows a functional construction of a resource use management device 400 according to this modification.

As shown in FIG. 4, the resource use management device 400 includes the counter 130, the control unit 140, a delay circuit 410, and a detection unit 420. Since the construction elements other than the delay circuit 410 and the detection unit 420 are the same as those in the resource use management device 100, the following explains only the difference from the resource use management device 100.

The delay circuit 410 is a typical delay circuit realized by a shift register 411 that has storage elements corresponding to the same number of stages as a number obtained by dividing the transmission cycle time period by one unit of time (i.e. the number of units of time per transmission cycle).

Each storage element in the shift register 411 stores "0" as an initial value. When "1" is input from the detection unit 420 (described later) into the shift register 411, the delay circuit 410 shifts the storage location of the input data "1" to a next stage per unit of time, based on the reference clock.

As a result, the data "1" input in the shift register 411 is output from the shift register 411 after the transmission cycle time period. This enables to count to the transmission cycle time period.

The delay circuit 410 outputs "1" output from the shift register 411, to the counter 130 as an add signal.

The detection unit 420 is basically the same circuit as the detection unit 120, but differs in that it inputs "1" into the shift register 411 in the delay circuit 410 upon detecting that the file transfer server 10 is permitted to perform packet transmission.

An operation of the resource use management device 400 in the communication network shown in FIG. 1 is described using a specific example below, with reference to a timing chart shown in FIG. 3B.

FIG. 3B shows an example packet transmission state of the file transfer server 10, where the number of packets the file transfer server 10 is permitted to transmit per transmission cycle is limited by the resource use management device 400. The numbers such as the number of packets the file transfer server 10 is permitted to transmit per transmission cycle are the same as those in FIG. 3A.

In FIG. 3B, a shift register 311 shows a storage location of data stored in the shift register 411 in the delay circuit 410.

The transmission cycle 303, the packet transmission 304, and the remaining transmission count 305 are the same as those in FIG. 3A, and so their explanation has been omitted here.

An operation corresponding to each timing is explained below, focusing on the difference from FIG. 3A.

T3 indicates a time at which the file transfer server 10 makes a packet transmission request. At T3, the remaining transmission count 305 is "2" which is larger than "0" and so the resource use management device 400 permits the file transfer server 10 to perform packet transmission, the remaining transmission count 305 is decreased by 1 to "1", and "1" is input to the shift register 311.

T4 indicates a time at which the file transfer server 10 makes a packet transmission request. At T4, the remaining transmission count 305 is "1" which is larger than "0", and so the resource use management device 400 permits the file transfer server 10 to perform packet transmission, the remaining transmission count 305 is decreased by 1 to "0", and "1" is input to the shift register 311. Meanwhile, "1" which was input to the shift register 311 at T3 is shifted by one bit.

T6 indicates a time at which "1" input to the shift register 311 at T3 is output from the shift register 311. At T7, the remaining transmission count 305 is increased by 1 to "1".

T7 indicates a time at which "1" input to the shift register 311 at T4 is output from the shift register 311. At T8, the remaining transmission count 305 is increased by 1 to "2".

T9 indicates a time at which the file transfer server 10 makes a packet transmission request. At T9, the remaining transmission count 305 is "2" which is larger than "0", and so the resource use management device 400 permits the file transfer server 10 to perform packet transmission, the remaining transmission count 305 is decreased by 1 to "1", and "1" is input to the shift register 311.

T10 indicates a time at which the file transfer server 10 makes a packet transmission request. At T10, the remaining transmission count 305 is "1" which is larger than "0", and so the resource use management device 400 permits the file transfer server 10 to perform packet transmission, the remaining transmission count 305 is decreased by 1 to "0", and "1" is input to the shift register 311. Meanwhile, "1" which was input to the shift register 311 at T9 is shifted by one bit.

T11 to T13 indicate times at which the file transfer server 10 makes a packet transmission request. At T11 to T13, the remaining transmission count 305 is "0", and so the resource use management device 400 prohibits the file transfer server 10 from packet transmission.

Thus, the packet transmission state of the file transfer server 10 in FIG. 3B agrees with the packet transmission state of the file transfer server 10 in FIG. 3A. This indicates that the same effects as the resource use management device 100 can be achieved even when the delay circuit 110 in the resource use management device 100 is replaced with the delay circuit 410 having the shift register 411.

The delay circuit 110 in the resource use management device 100 needs the same number of timers as the maximum number of packets the file transfer server 10 is permitted to transmit per transmission cycle. In a case where the maximum number of packets is relatively large such as several hundreds, several hundreds of timers are needed, which causes an increase in circuit scale of the delay circuit 110.

On the other hand, the delay circuit 410 in the resource use management device 400 can be realized by a shift register having the same number of bits as the maximum number of packets the file transfer server 10 is permitted to transmit per transmission cycle. This construction has less effect on the circuit scale.

Accordingly, in a case where the maximum number of packets the file transfer server 10 is permitted to transmit per transmission cycle is large, an increase in circuit scale of the resource use management device can be reduced by using the delay circuit 410 having the shift register 411.

Also, as in the case where none of the timers in the delay circuit 110 is counting time, when "1" is not stored in the shift register 411, the resource use management device 400 can be switched to a low power mode by stopping a clock supply, a power supply, and the like to the shift register 411.

Second Embodiment

The following describes a bus arbitration device that uses the resource use management device according to the present invention, as a second embodiment of the present invention.

<Overview>

A bus arbitration device 500 according to the second embodiment applies the mechanism of the resource use management device according to the present invention, to arbitration between memory access requests by two bus masters that are a processor and a DMA controller.

In detail, when a memory access request by the processor conflicts with a memory access request by the DMA controller, the bus arbitration device 500 permits the processor to perform memory access over the DMA controller, so long as the number of memory accesses by the processor per transfer cycle (e.g. 63.6 µs which is a horizontal scanning period of video) is no more than a predetermined number. If the number of memory accesses by the processor per transfer cycle reaches the predetermined number, the bus arbitration device 500 prohibits the processor to perform memory access and permits the DMA controller to perform memory access.

In this way, the access delay by the processor can be reduced by prioritizing the processor under a condition that the number of accesses by the processor per transfer cycle is within the predetermined number. Also, when the number of memory accesses by the processor per transfer cycle reaches the predetermined number, the processor is prohibited to perform memory access, while the DMA controller is permitted to perform memory access. As a result, the fixed number of accesses per transfer cycle can be ensured for the DMA controller.

<Construction>

A construction of the bus arbitration device 500 according to the second embodiment is described below, with reference to FIG. 5.

Figure 5:
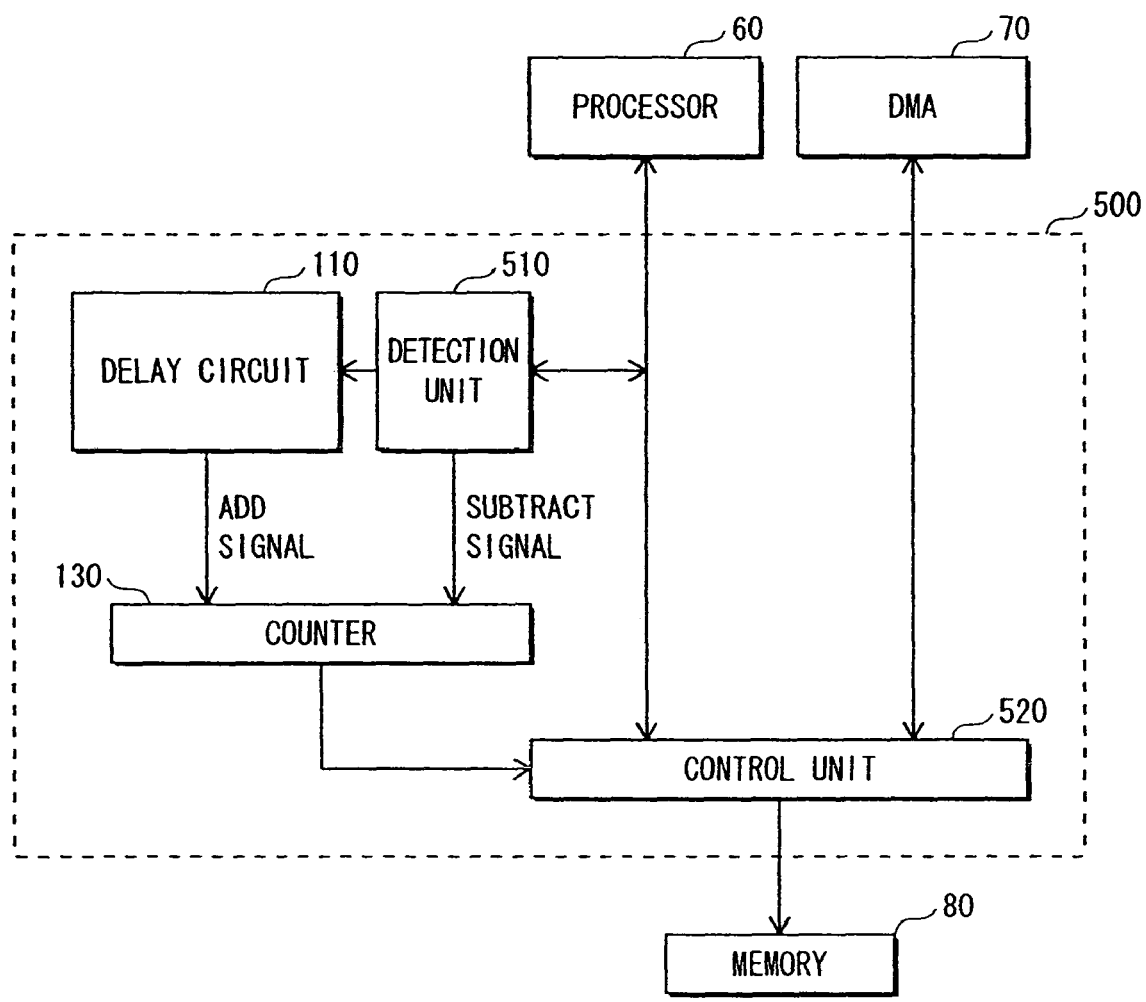
FIG. 5 shows a functional construction of a bus arbitration device according to a second embodiment of the present invention.

FIG. 5 shows a functional construction of the bus arbitration device 500 according to the second embodiment.

The bus arbitration device 500 is connected to a processor 60 and a DMA controller 70 that are bus masters, and a memory 80 that is a resource shared by the processor 60 and the DMA controller 70, via a bus.

The processor 60 reads control data stored on the memory 80, and exercises system controls (e.g. display screen switching controls). For display screen switching controls and the like of high user responsiveness, an access delay needs to be reduced as much as possible when a memory access request is issued from the processor 60.

The DMA controller 70 reads video data stored on the memory 80. The video data read by the DMA controller 70 is sequentially played back by a playback device. For normal playback of video data, a fixed number of accesses per transfer cycle (e.g. within 63.6 µs) need to be ensured for the DMA controller 70.

The bus arbitration device 500 includes the delay circuit 110, the counter 130, a detection unit 510, and a control unit 520, as shown in FIG. 5.

The construction elements other than the detection unit 510 and the control unit 520 are the same as those in the resource use management device 100 in the first embodiment, and so their explanation has been omitted here.

The detection unit 510 is basically the same circuit as the detection unit 120 in the resource use management device 100 according to the first embodiment, but differs in that it detects, per unit of time, that the processor 60 is permitted to access the memory 80.

The detection of the access permission is made by detecting an ACK signal output from the control unit 520 (described later) to the processor 60, in the same way as the detection unit 120.

The control unit 520 is a so-called bus arbiter circuit that arbitrates for access to the memory 80 per unit of time based on the counter 130, when access requests by the processor 60 and the DMA controller 70 conflict with each other.

In more detail, as with the control unit 140 in the first embodiment, the control unit 520 includes a comparison circuit, and compares whether or not the counter 130 is larger than 0 at the beginning of each unit of time. In the case where the processor 60 and the DMA controller 70 compete for memory access, if the counter 130 is larger than 0, the control unit 520 permits the processor 60 to access the memory 80, and outputs an ACK signal to the processor 60.

If the counter 130 is 0, on the other hand, the control unit 520 prohibits the processor 60 to access the memory 80. Instead, the control unit 520 permits the DMA controller 70 to access the memory 80, and outputs an ACK signal to the DMA controller 70.

The method of detecting the beginning of each unit of time is the same as that of the control unit 140 in the first embodiment.

<Operation>

An operation of the bus arbitration device 500 is explained below.

An operation of the detection unit 510 is the same as that of the detection unit 120 in the first embodiment shown in FIG. 2B, where the packet transmission by the file transfer server 10 is replaced with the access to the memory 80 by the processor 60. Also, an operation of the delay circuit 110 is the same as that of the delay circuit 110 in the first embodiment shown in FIG. 2C. Accordingly, the following describes only an operation of the control unit 520.

<Operation of the Control Unit 520>

Figure 6:
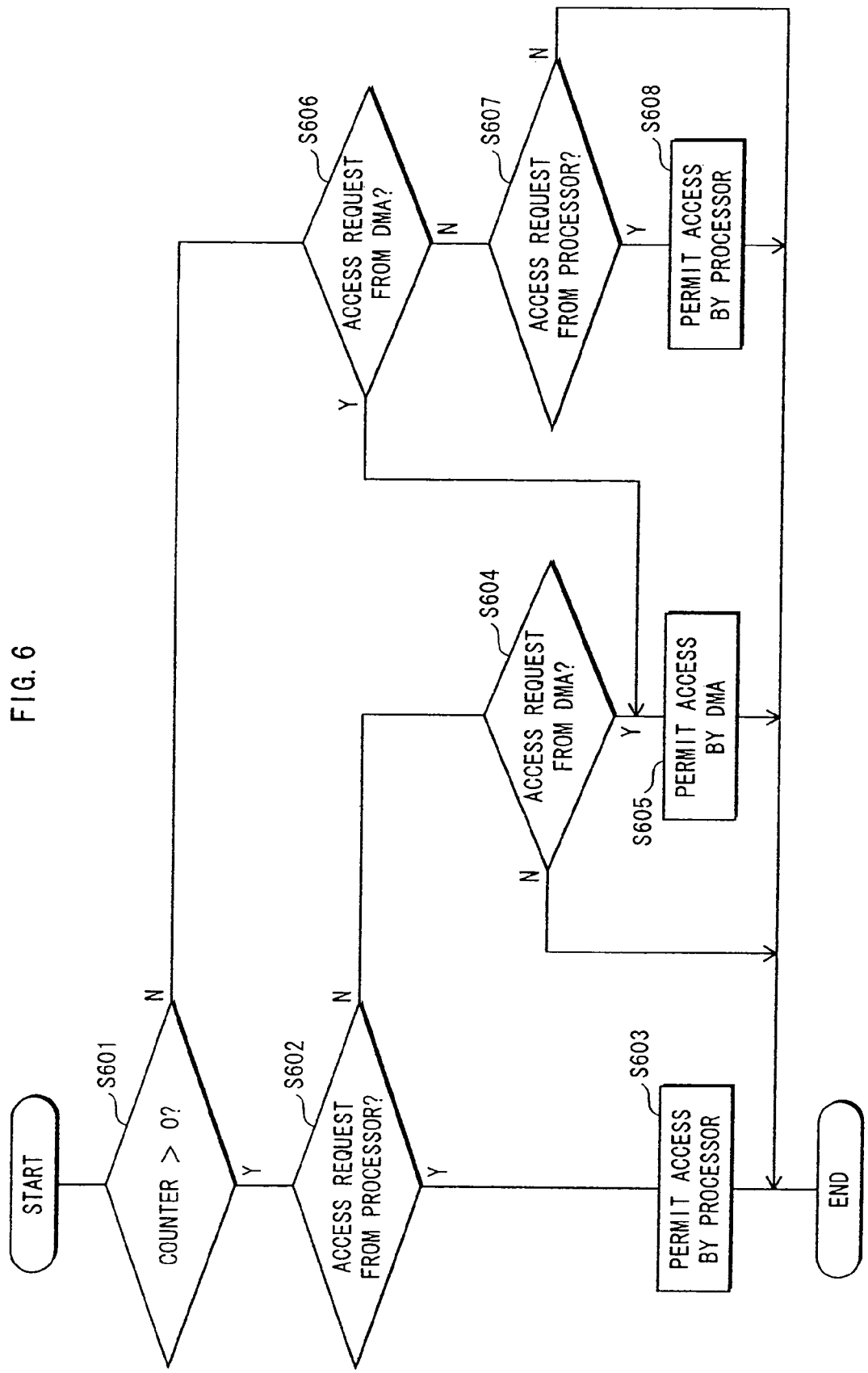
FIG. 6 is a flowchart showing an operation of a control unit in the bus arbitration device shown in FIG. 5.

FIG. 6 is a flowchart showing the operation of the control unit 520 in the bus arbitration device 500. The operation of the control unit 520 is explained below, by referring to FIG. 6.

The control unit 520 judges, per unit of time, whether or not the counter 130 is larger than 0 (step S601). If the counter 130 is larger than 0 (step S601: Y), the control unit 520 judges whether or not a memory access request is received from the processor 60 (step S602).

If a memory access request is received from the processor 60 in step S602 (step S602: Y), the control unit 520 permits the processor 60 to perform memory access in the unit of time by outputting an ACK signal to the processor 60 (step S603), and ends the operation.

If no memory access request is received from the processor 60 in step S602 (step S602: N), the control unit 520 judges whether or not a memory access request is received from the DMA controller 70 (step S604).

If a memory access request is received from the DMA controller 70 in step S604 (step S604: Y), the control unit 520 permits the DMA controller 70 to perform memory access in the unit of time by outputting an ACK signal to the DMA controller 70 (step S605), and ends the operation.

If no memory access request is received from the DMA controller 70 in step S604 (step S604: N), the control unit 520 ends the operation.

If the counter 130 is 0 in step S601 (step S601: N), the control unit 520 judges whether or not a memory access request is received from the DMA controller 70 (step S606).

If a memory access request is received from the DMA controller 70 in step S606 (step S606: Y), the control unit 520 proceeds to step S605. If no memory access request is received from the DMA controller 70 in step S606 (step S606: N), the control unit 520 judges whether or not a memory access request is received from the processor 60 (step S607).

If a memory access request is received from the processor 60 in step S607 (step S607: Y), the control unit 520 permits the processor 60 to perform memory access in the unit of time by outputting an ACK signal to the processor 60 (step S608), and ends the operation.

If no memory access request is received from the processor 60 in step S607 (step S607: N), the control unit 520 ends the operation.

<Specific Example>

An operation of the bus arbitration device 500 is explained using a specific example below, with reference to a timing chart shown in FIG. 7.

FIG. 7 shows an example of memory access states of the processor 60 and the DMA controller 70, where the number of memory accesses the processor 60 is permitted to perform per transfer cycle is limited by the bus arbitration device 500, and the fixed number of memory accesses per transfer cycle are ensured for the DMA controller 70.

In this example, the number of memory accesses that can be performed per transfer cycle (e.g. 63.6 μs) is "5", the number of memory accesses ensured for the DMA controller 70 per transfer cycle is "3", and the maximum number of memory accesses the processor 60 is permitted to perform per transfer cycle is "2". This condition is the same as that in the conventional bus arbitration device shown in FIG. 9.

In FIG. 7, a timer 701 and a timer 702 are respectively the same as the timer 301 and the timer 302 shown in FIG. 3A, and so their explanation has been omitted here.

A transfer cycle 703 shows a transfer cycle in the DMA controller 70, where one transfer cycle is made up of time slices 1 to 5.

A DMA 704 shows whether or not an access request is made by the DMA controller 70 and whether or not the access request is permitted. A processor 705 shows whether or not an access request is made by the processor 60 and whether or not the access request is permitted. Marks "I", "A", and "W" in FIG. 7 are the same as those in FIG. 9, and so their explanation has been omitted here.

A remaining access count 706 shows the value of the counter 130.

An operation corresponding to each timing is explained below.

T1 and T2 indicate times at which only the DMA controller 70 makes an access request. At T1 and T2, the bus arbitration device 500 permits the DMA controller 70 to perform access.

T3 indicates a time at which the processor 60 and the DMA controller 70 make an access request. At T3, the remaining access count 706 is "2" which is larger than "0", and so the bus arbitration device 500 permits the processor 60 to perform access, the remaining access count 706 is decreased by 1 to "1", and the first timer 111 starts counting time, as a result of which the timer 701 is "4".

T4 indicates a time at which the processor 60 and the DMA controller 70 make an access request. At T4, the remaining access count 706 is "1" which is larger than "0", and so the bus arbitration device 500 permits the processor 60 to perform access, the remaining access count 706 is decreased by 1 to "0", and the second timer 112 starts counting time, as a result of which the timer 702 is "4". Meanwhile, the timer 701 is decreased by 1 to "3".

T5 indicates a time at which only the DMA controller 70 makes an access request. At T5, the bus arbitration device 500 permits the DMA controller 70 to perform access. Meanwhile, the timer 701 and the timer 702 are decreased by 1 to "2" and "3", respectively.

Thus, in the transfer cycle of T1 to T5, when an access request is made by the processor 60, the processor 60 is prioritized in access permission, while ensuring three accesses for the DMA controller 70.

T6 indicates a time at which the timer 701 becomes "0" and is stopped. At T7, the remaining access count 706 is increased by 1 to "1".

T7 indicates a time at which the timer 702 becomes "0" and is stopped. At T8, the remaining access count 706 is increased by 1 to "2".

T9 and T10 indicate times at which the processor 60 and the DMA controller 70 make an access request. At T9 and T10, the remaining access count 706 is larger than "0", and so the bus arbitration device 500 permits the processor 60 to perform access, and the remaining access count 706 is decreased to "0".

T11 to T13 indicate times at which the processor 60 and the DMA controller 70 make an access request. At T11 to T13, the remaining access count 706 is "0", and so the bus arbitration device 500 prohibits the processor 60 to perform access and permits the DMA controller 70 to perform access.

Thus, in the transfer cycle of T9 to T13, the processor 60 is prioritized in access permission in response to its access request. Also, three accesses per transfer cycle are ensured for the DMA controller 70, since the number of accesses by the processor 60 is appropriately limited to the maximum number of accesses "2".

That is, the bus arbitration device 500 using the resource use management device according to the present invention limits the number of accesses the processor 60 is permitted to perform in the transfer cycle time period, each time the processor 60 is permitted to perform memory access. Therefore, in any transfer cycle that is assumed to begin at the beginning of any unit of time, the fixed number of memory accesses per transfer cycle can be ensured for the DMA controller 70, without exceeding the maximum number of accesses the processor 60 is permitted to perform per transfer cycle.

Third Embodiment

Overview

The bus arbitration device 500 according to the second embodiment arbitrates between accesses requests by the processor 60 and the DMA controller 70.

A bus arbitration device 800 according to a third embodiment of the present invention arbitrates between access requests by two processors and a DMA controller.

To do so, the bus arbitration device 800 selects one of the two processors, and arbitrates between access requests by the selected processor and the DMA controller.

The selection of one of the two processors can be performed by using various arbitration methods such as a priority method and a round robin method.

<Construction>

Figure 8:
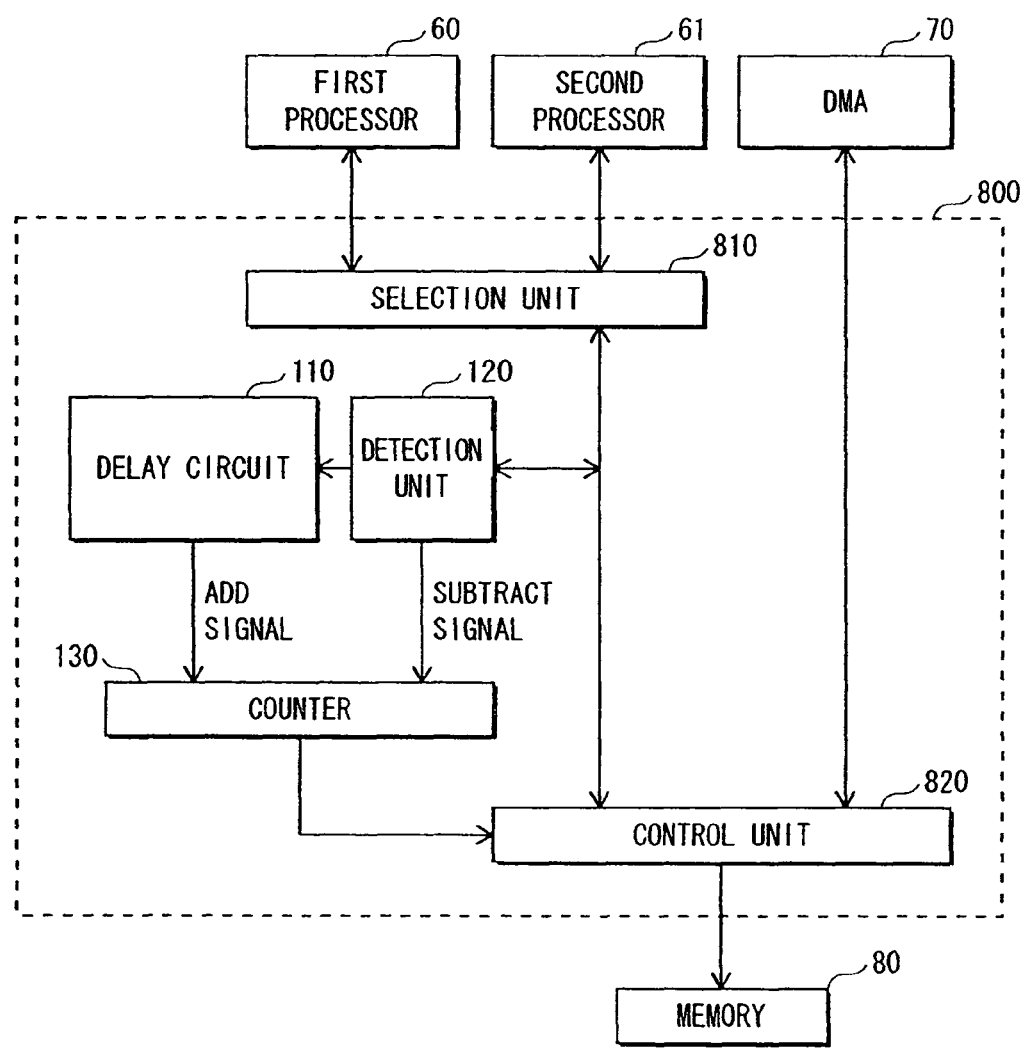
FIG. 8 shows a functional construction of a bus arbitration device according to a third embodiment of the present invention.

The following describes a construction of the bus arbitration device 800 according to the third embodiment, with reference to FIG. 8.

FIG. 8 shows a functional construction of the bus arbitration device 800 according to the third embodiment.

The bus arbitration device 800 is connected to a first processor 60, a second processor 61, and the DMA controller 70 that are bus masters, and the memory 80 that is a resource shared by these bus masters, via a bus.

The first processor 60 is the same as the processor 60 in the second embodiment, and the DMA controller 70 is the same as the DMA controller 70 in the second embodiment. Accordingly, their explanation has been omitted here.

The second processor 61 reads processing data stored on the memory 80, in order to perform a different process (e.g. image processing, data conversion processing, and the like) from the first processor 60. When a need to access the memory 80 arises, the second processor 61 sends an access request to the bus arbitration device 800 in the same way as the first processor 60.

As shown in FIG. 8, the bus arbitration device 800 includes the delay circuit 110, the detection unit 120, the counter 130, a selection unit 810, and a control unit 820.

The delay circuit 110, the detection unit 120, and the counter 130 are the same as those in the bus arbitration device 500 in the second embodiment and so their explanation has been omitted here. The following describes the selection unit 810 and the control unit 820.

The selection unit 810 is a so-called bus arbiter circuit that selects, at the beginning of each unit of time, a processor that is subjected to arbitration by the control unit 820 (described later) in the unit of time, when access requests by the first processor 60 and the second processor 61 conflict with each other.

A method of selecting one of the processors has no specific limit. For example, various conventional arbitration methods, such as a priority method of arbitrating based on priorities which have been assigned to the first processor 60 and the second processor 61 beforehand, and a round robin method of alternately prioritizing the first processor 60 and the second processor 61 per unit of time, are applicable.

A method of detecting the beginning of each unit of time is the same as the one used by the control unit 140 in the first embodiment.

The control unit 820 is basically the same bus arbiter circuit as the control unit 520 in the second embodiment, but differs in that it arbitrates between one of the first processor 60 and the second processor 61 selected by the selection unit 810 and the DMA controller 70.

Note here that the timing with which the control unit 820 compares whether or not the counter 130 is larger than 0 has a slight delay from the timing with which the selection unit 810 selects one processor (the beginning of each unit of time).

<Operation>

Operations of the detection unit 120 and the delay circuit 110 in the bus arbitration device 800 are the same as those in the first embodiment, and an operation of the selection unit 810 is the same as a conventional bus arbitration method. Accordingly, their explanation has been omitted here.

Also, an operation of the control unit 820 is the same as the operation of the control unit 520 in the second embodiment shown in FIG. 6, except that the processor in steps S602, S603, S607, and S608 is one of the first processor 60 and the second processor 61 that is selected by the selection unit 810, so that its explanation has been omitted here.

<Supplementary Remarks>

The resource use management device according to the present invention has been described by way of the above embodiments, but the present invention is not limited to the above. For example, the following modifications are possible.

(1) The above embodiments describe the case where the counter 130 increases/decreases a value expressed in decimal. However, the representation of the counter is not limited to decimal. For instance, the counter may have a binary representation. Further, any device that can associate a change in internal state with an increase/decrease of a value can be used as the counter.

(2) The first embodiment describes the case where the counter 130 is decreased by 1 each time the detection unit 120 performs the detection, and the file transfer server 10 is permitted to perform packet transmission if the counter 130 is larger than 0. As an alternative, a construction in which the counter 130 is increased by 1 each time the detection unit 120 performs the detection may be used. In this case, the file transfer server 10 is permitted to perform packet transmission if the counter 130 is no larger than the maximum number of packets the file transfer server 10 is permitted to transmit per transmission cycle.

This modification is applicable to not only the first embodiment but also the other embodiments and modifications.

(3) The first embodiment describes the case where the control unit 140 outputs an ACK signal in response to a packet transmission request from the file transfer server 10 in order to permit the packet transmission request, but the present invention is not limited to this.

As one example, instead of outputting a packet transmission request to the control unit 140, the file transfer server 10 outputs predetermined information (e.g. packet data to be transmitted) to the control unit 140, and the control unit 140 queues the information. To allow the file transfer server 140 to perform packet transmission, the control unit 140 outputs the queued information to the router.

This modification is applicable to not only the first embodiment but also the other embodiments and modifications.

(4) The first embodiment describes the case where the control unit 140 judges whether or not to permit packet transmission per unit of time. Alternatively, the control unit 140 may perform the judgment upon receiving a packet transmission request from the file transfer server 10.

This modification is applicable to not only the first embodiment but also the other embodiments and modifications.

(5) The first embodiment describes an example where the file transfer server 10 and the video streaming server 20 transmit packet data. However, the present invention can also be applied to a construction in which a file transfer unit having a file transfer function and a video streaming unit having a video streaming function are implemented on one computer that functions as the resource use management device 100, and transmit packet data.

(6) The modification to the first embodiment describes the case where the initial value of the shift register 411 is "0" and the data input to the shift register 411 is "1". This can be reversed such that the initial value of the shift register 411 is "1" and the input data is "0".

Also, the modification to the first embodiment describes the case where the input data of the shift register 411 is 1 bit, but the input data may be 2 or more bits. That is, any shift register that can output data the transmission cycle time period after the detection by the detection unit 120 is applicable.

(7) The second and third embodiments describe a processor and a DMA controller as example devices that serve as bus masters, but the present invention is not limited to such. Any device, such as a sequencer or a bus bridge, that can output an access request to a bus may be used. Also, another bus arbitration device may be cascade-connected at a higher level.

Also, the second and third embodiments describe a memory as an example device that serves as a bus slave, but the present invention is not limited to such. Any device, such as various input/output devices and registers, that is accessed by a bus master may be used. Also, a plurality of bus slave devices may be connected.

(8) The third embodiment describes the case where the control unit 820 arbitrates between access requests by one processor selected by the selection unit 810 and one DMA controller, but a plurality of DMA controllers may be used.

In this case, when the counter 130 is "0" and so one of the DMA controllers can be permitted to perform memory access, the control unit 820 selects one DMA controller according to any of the various conventional arbitration methods such as a priority method and a round robin method.

(9) The second embodiment describes the case where the detection unit 510 and the control unit 520 in the bus arbitration device 500 operate per unit of time based on the reference clock, but this can be modified as follows. Since a processing time for reading data from the memory 80 (i.e. a duration of one transaction) is approximately equal to one unit of time, the control unit 520 arbitrates between access requests and the detection unit 510 detects an ACK signal each time one transaction ends.

This modification is equally applicable to the third embodiment.

(10) The second embodiment describes the case where the bus arbitration device 500 includes the delay circuit 110, but the delay circuit 410 according to the modification to the first embodiment may be used instead of the delay circuit 110. In such a case, upon detecting that the processor 60 is permitted to access the memory 80, the detection unit 510 in the bus arbitration device 500 inputs "1" to the shift register 411 in the delay circuit 410.

Also, though the delay circuit 410 is described as operating per unit of time based on the reference clock, the delay circuit 410 may operate irrespective of the reference clock as mentioned earlier. In detail, each time one transaction ends, the control unit 510 outputs a predetermined timing signal to the delay circuit 410. Upon receiving the timing signal, the delay circuit 410 shifts data stored in the shift register 411 to a next stage.

This modification is equally applicable to the third embodiment.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A resource use management device for managing use of a resource by an external device and another specific external device that time-share the resource, the resource use management device comprising:

a counter;

a control unit operable to judge whether to allow the external device to use the resource, based on a value of the counter;

a detection unit operable to detect that the external device is allowed to use the resource based on the judgment, by the control unit, that the external device is allowed to use the resource, and advance the value of the counter each time the detection is performed; and a delay unit operable to move back the value of the counter when a predetermined time period has elapsed since each time the detection is performed, wherein when the judgment, by the control unit, is that the external device is not allowed to use the resource, the control unit judges to allow the specific external device to use the resource.

2. The resource use management device of claim 1, wherein the control unit judges not to allow the external device to use the resource, if the value of the counter is a predetermined value.

3. The resource use management device of claim 1, wherein the detection unit advances the value of the counter by 1 each time the detection is performed, the delay unit moves back the value of the counter by 1 when the predetermined time period has elapsed since each time the detection is performed, and the control unit judges not to allow the external device to use the resource, when a difference between the value of the counter and an initial value of the counter is equal to or larger than a value corresponding to a number of units of time in which the external device is able to use the resource per cycle of the predetermined time period.

4. The resource use management device of claim 1, wherein an initial value of the counter is no smaller than 2, the detection unit decreases the value of the counter by 1 each time the detection is performed, the delay unit increases the value of the counter by 1 when the predetermined time period has elapsed since each time the detection is performed, and the control unit judges not to allow the external device to use the resource, when the value of the counter is 0.

5. The resource use management device of claim 1, wherein the external device is a processor, and the resource is a memory.

6. The resource use management device of claim 1, wherein the external device is a communication terminal, and the resource is a transmission line.

7. The resource use management device of claim 1, wherein the delay unit includes a same number of timers as a number of units of time in which the external device is able to use the resource per cycle of the predetermined time period, and the delay unit starts one of the timers which is not in operation to count to the predetermined time period each time the detection is performed, and moves back the value of the counter after the timer counts to the predetermined time period.

8. The resource use management device of claim 1, wherein the delay unit includes a shift register having storage elements corresponding to a same number of stages as a number obtained by dividing the predetermined time period by one unit of time, and the delay unit inputs data into the shift register each time the detection is performed, shifts a storage location of the data to a next stage per unit of time, and moves back the value of the counter when the data is output from the shift register.

9. The resource use management device of claim 8 capable of switching between a first mode that is a normal operation mode and a second mode that is a lower power consumption mode than the first mode, wherein the first mode is switched to the second mode when no data is held in the shift register.

10. The resource use management device of claim 1, wherein the control unit judges to allow the external device to use the resource irrespective of the value of the counter, if the specific external device does not need to use the resource.

11. The resource use management device of claim 10, wherein the detection unit refrains from performing the detection when the value of the counter is a predetermined value.

12. The resource use management device of claim 10, wherein the delay unit refrains from moving back the value of the counter when the value of the counter is an initial value of the counter.

13. The resource use management device of claim 1 further comprising:

a selection unit operable to select one of a plurality of devices as the external device.

14. A resource use management system including an external device, another specific external device, a resource, and a resource use management device for managing use of the resource by the external device and the specific external device that time-share the resource, the resource use management device comprising:

a counter;

a control unit operable to judge whether to allow the external device to use the resource, based on a value of the counter;

a detection unit operable to detect that the external device is allowed to use the resource based on the judgment, by the control unit, that the external device is allowed to use the resource, and advance the value of the counter each time the detection is performed; and a delay unit operable to move back the value of the counter when a predetermined time period has elapsed since each time the detection is performed, wherein when the judgment, by the control unit, is that the external device is not allowed to use the resource, the control unit judges to allow the specific external device to use the resource.

15. The resource use management system of claim 14, wherein the external device is a processor, and the resource is a memory.

16. The resource use management system of claim 14, wherein the external device is a communication terminal, and the resource is a transmission line.

17. A control method used in a resource use management device for managing use of a resource by an external device and another specific external device that time-share the resource, the control method comprising steps of:

judging, by a control unit, whether to allow the external device to use the resource, based on a value of a counter;

detecting that the external device is allowed to use the resource based on the judgment, in said judging step, that the external device is allowed to use the resource, and advancing the value of the counter each time the detection is performed; and moving back the value of the counter when a predetermined time period has elapsed since each time the detection is performed, wherein when the judgment, in said judging step, is that the external device is not allowed to use the resource, said judging step further includes judging to allow the specific external device to use the resource.

* * * * *